United States Patent
Green et al.

[15] 3,691,354
[45] Sept. 12, 1972

[54] SYSTEM FOR CONTROLLING A SINGLE CONTROL VARIABLE BY PROPORTIONING A PLURALITY OF RELATED MANIPULATED VARIABLES

[72] Inventors: Thomas A. Green, Roslyn; Charles W. Ross, Hatboro, both of Pa.

[73] Assignee: Leeds & Northrup Company, Philadelphia, Pa.

[22] Filed: June 18, 1971

[21] Appl. No.: 154,370

[52] U.S. Cl..................................235/150.1, 444/1
[51] Int. Cl.............................................G05b 15/02
[58] Field of Search...........235/150.1, 151.12, 151.1; 318/609, 610

[56] References Cited

UNITED STATES PATENTS

| | | |
|---|---|---|
| 3,039,687 | 6/1962 | Chope..................235/151.1 X |
| 3,075,700 | 1/1963 | Bishop..................235/151.1 X |
| 3,466,430 | 9/1969 | Hardaway...............235/150.1 |

*Primary Examiner*—Eugene G. Botz
*Attorney*—William G. Miller, Jr. and Raymond F. MacKay

[57] ABSTRACT

A digital control system determines a control signal in accordance with proportional and integral control responses. The control signal is proportioned among a plurality of final control elements so as to modify related manipulated variables. The values of the manipulated variables are summed and that sum is similarly proportioned. The resulting individual portions are then compared with the value of the associated manipulated variable and the difference is added to the corresponding proportions of the control signal to correct the divergence of the response of the control elements from the desired proportioned response.

8 Claims, 6 Drawing Figures

INVENTORS
THOMAS A. GREEN
CHARLES W. ROSS

BY William G. Miller Jr.

AGENT

FIG. 3b

SYSTEM FOR CONTROLLING A SINGLE CONTROL VARIABLE BY PROPORTIONING A PLURALITY OF RELATED MANIPULATED VARIABLES

BACKGROUND OF THE INVENTION

In automatic control systems for processes requiring the proportioning of related manipulated variables to properly control a control variable, the maintenance of the desired proportional relationship has been difficult to optimally maintain in systems utilizing digital control. In the past only analog control systems controlling a plurality of manipulated variables have been utilized because of the availability of continuous feedback from the manipulated variables. However, optimal control by analog means has been limited due to computational and logical restrictions of analog control elements.

It is therefore an object of this invention to provide an improved digital control system for a plurality of related manipulated variables controlling a single control variable at a set point.

It is another object of this invention to provide a system which will correct for any control response or lack of control response which takes the manipulated variables under control away from their predetermined relationship.

SUMMARY OF THE INVENTION

The disclosed method provides means for controlling a plurality of related manipulated variables in a process so as to maintain a measured process variable at its set point while at the same time maintaining a predetermined relationship between the manipulated variables. The system for accomplishing this objective may consist of the following steps and apparatus necessary for carrying out those steps.

First there is produced in response to an error signal a first control signal which is calculated as the deviation of the measured process variable from its set point. That first control signal represents the total change desired in all of the manipulated variables to bring the measured process variable back to its set point. There is then produced a second control signal for each manipulated variable in response to the first control signal. That second control signal represents a predetermined part of the first control signal such that the sum of the second control signals will represent the total value of the first control signal.

There is then produced a third control signal by the addition to each of the second control signals of a correction signal which would represent the deviation of the value of the manipulated variable from a value representing a predetermined part of the total value of all of the manipulated variables. Each of the manipulated variables is modified in accordance with the value of the associated third control signal and the value of each manipulated variable is measured.

In order to provide for the maintenance of the proper proportional relationships between the manipulated variables the measured values of all of the manipulated variables are summed to obtain a total value for the manipulated variables. From that total value there is produced a value for each of the manipulated variables which is a partial signal representing a predetermined part of the total value for the manipulated variables with the total of all of the parts equalling the total value of the manipulated variable. Each of the partial signals is compared to the measured value of the corresponding manipulated variable and there is produced by the difference therebetween the correction signals which are added to the second control signal as mentioned above.

DESCRIPTION OF THE PREFERRED EMBODIMENT

Figure 1:
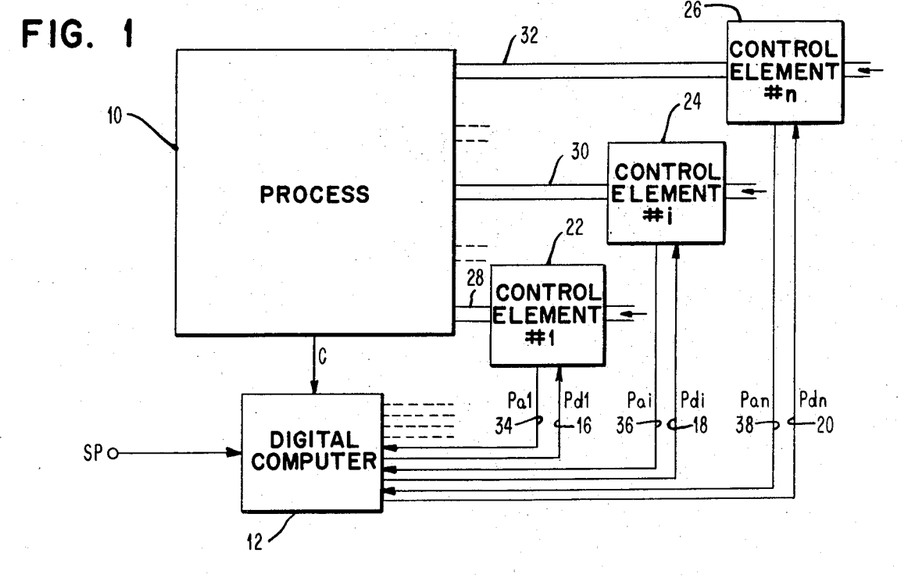
FIG. 1 is a block diagram showing a control system utilizing a digital computer to control a plurality of control elements to adjust a controlled variable of a process.

FIG. 1, which is illustrative of the overall control system with which the present invention is concerned, shows a process 10 being controlled by a digital computer 12 in response to the measurement of a process variable which is to be controlled, namely $c$. The value of the process variable is compared with an input signal "SP", representative of the set point, to produce control signals on lines 16, 18 and 20 to the separate control elements such as 22, 24 and 26, respectively. Those control elements each modify one of the inputs to the process, which are here represented as a flow of material such as fuel, through the pipes 28, 30 and 32.

Signals representing the value of each of $n$ manipulated variables associated with the control elements such as 22, 24 and 26, namely $Pa_1$, $Pa_i$ and $Pa_n$ are sent by way of lines such as 34, 36 and 38, respectively, to the computer 12 where they are utilized in the calculation of the signals $Pd_1$, $Pd_i$ and $Pd_n$ which represent the desired values for the manipulated variables, such as the positions of the final control elements.

The process 10 of FIG. 1 is assumed to be a process of the type in which it is desired to provide a predetermined relationship between each of the $i$ inputs to the process through the pipes, such as 28, 30 and 32, while at the same time adjusting the total magnitude of the $n$ inputs so as to maintain the control variable $c$ at its set point. The process 10 may, for example, be a steam generating boiler in which a plurality $n$ of oil fired burners are utilized to provide the fuel inputs and where it is required that the flow of oil to the burners be proportioned in a predetermined manner so as to maintain the controlled variable, such as steam pressure, at its desired value. Many other processes have similar requirements for the proportioning of the manipulated variables utilized to control a particular control variable of the process. Such processes include, for example, the proportioning of the air flow through several cooling fans in a cement process for the clinker cooling grate so as to maintain a selected cooling profile and still keep air flow at its desired value.

Figures 1A, 1B:
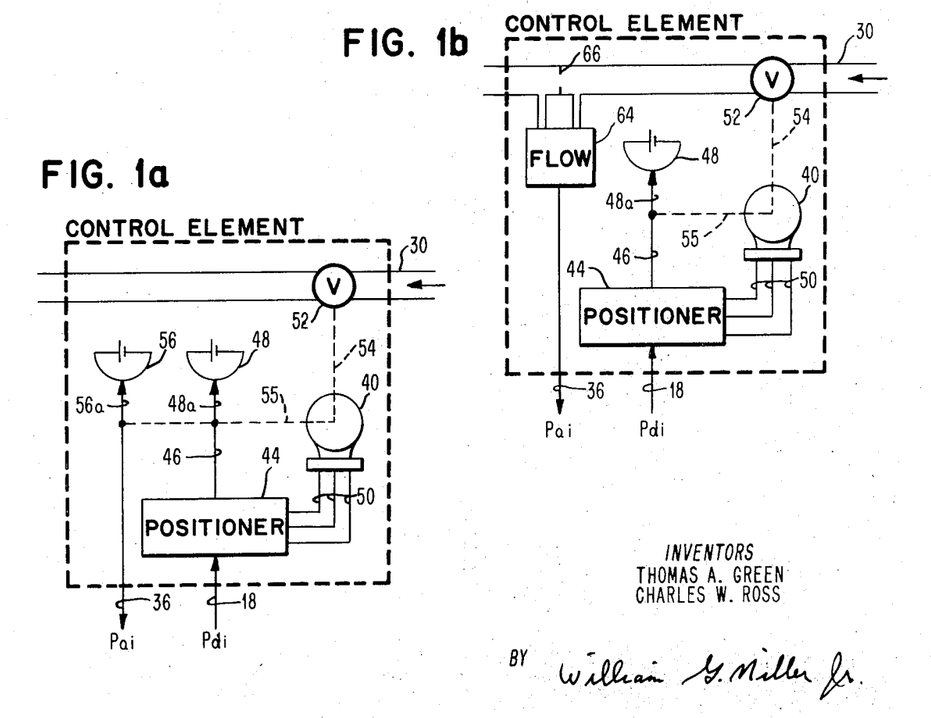
FIG. 1a is a circuit diagram of one form of control element which may be used in FIG. 1.
FIG. 1b is a circuit diagram of another form of a control element which may be used in a system of FIG. 1.

FIG. 1a shows one form which the control elements 22, 24 and 26 may take. In FIG. 1a the desired position of the valve drive motor 40 is supplied to the control element in the form of a signal on line 18 representing the desired value of the manipulated variable $i$, namely position $Pd_i$. The signal $Pd_i$ provides an input to the motor positioner 44 which compares the signal on line 18 with that on line 46 from slidewire 48, which signal represents the actual position of the valve drive motor 40 or its percent of full travel. The motor positioner 44 provides over its three output lines 50 the power necessary to drive the motor 40 in either direction so as to position the valve 52 through the mechanical coupling 54 and at the same time position the contact 48a of slidewire 48 through the mechanical coupling 55.

By a further extension of the mechanical coupling 55 the contact 56a of slidewire 56 is positioned so as to be representative of the position of the shaft of motor 40 and hence of valve 52 or the percent of its full travel, whichever may be desired.

Each of these slidewires 48 and 56 is supplied by a D.C. potential source as shown.

It will thus be evident that the control element of FIG. 1a provides for an adjustment of the fluid flow through the pipe 30 in accordance with the magnitude of the input signal $Pd_i$ by the adjustment of valve 52 and the control element also provides on line 36 a signal $Pa_i$ representative of the value of manipulated variable $i$. Thus, in this particular arrangement the manipulated variable is the valve position.

In FIG. 1b an alternative form of the control element which may be used in FIG. 1 is shown with a motor positioner 44 similar to that of FIG. 1a supplied by a signal $Pd_i$ indicating the desired position for the valve 52 and hence indirectly indicating the desired flow in pipe 30. The positioner 44 provides over the output lines 50 the power required to revolve motor 40 in either direction so as to provide through the mechanical coupling 54 the necessary desired positioning of valve 52 and to provide through the mechanical coupling 55 a positioning of the contact 48a on slidewire 48 so as to supply on line 46 to the position 44 a signal representative of the actual position of valve 52 or its percent of full travel.

In FIG. 1b the manipulated variable $Pa_i$ is obtained by means of a flowmeter 64 which is connected by way of pressure taps to the pipe 30 such that the flow is measured in accordance with the pressure drop across the restriction 66. Thus, in FIG. 1b the manipulated variable is the value of the flow through pipe 30 as contrasted with the arrangement of FIG. 1a in which the manipulated variable is the position of the valve 52 and therefore is only indirectly representative of the flow through the pipe 30.

Figure 2:
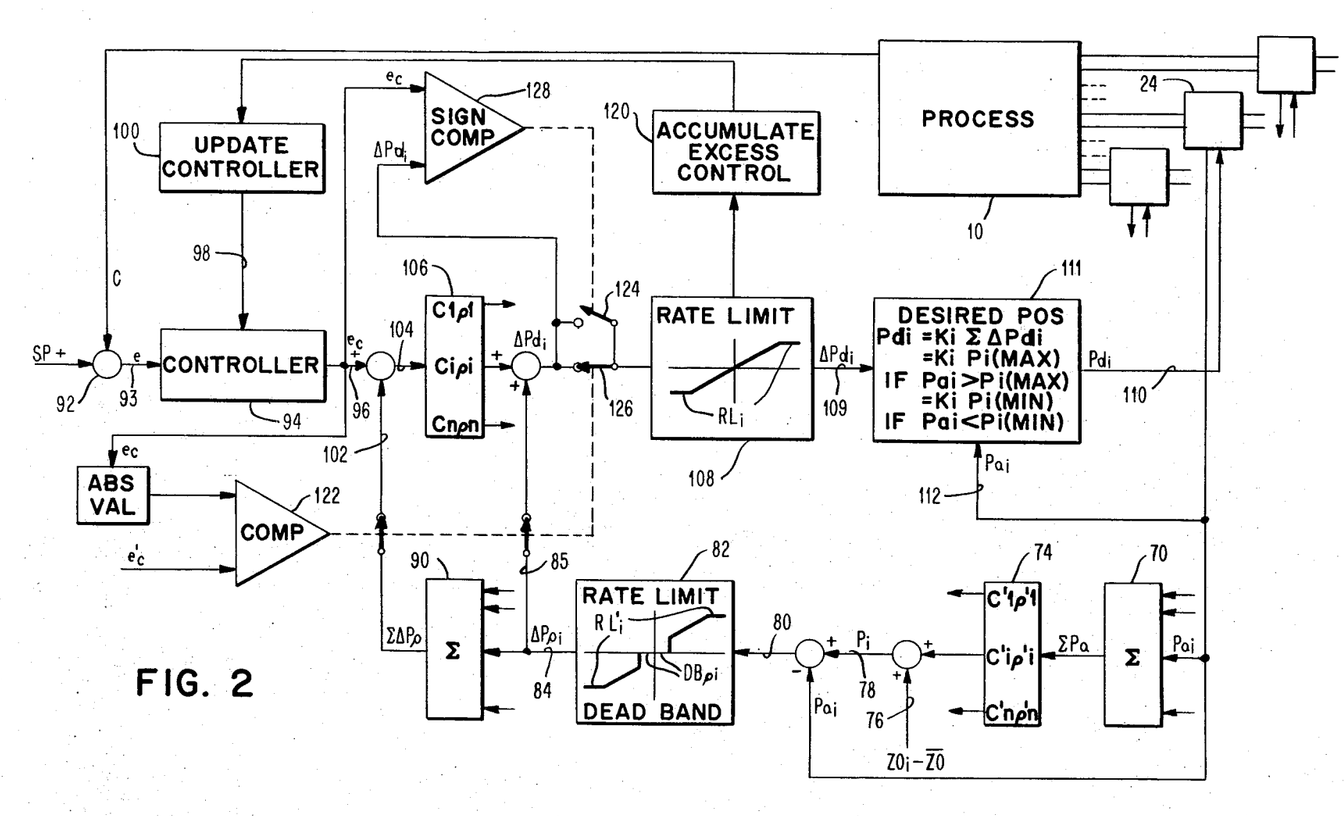
FIG. 2 is a signal processing diagram illustrating the various signal processing steps which make up the novel method.

In FIG. 2 there is shown in block diagram form similar to that of a comparable analog control system the signal processing steps which are utilized in accomplishing the novel control method. These signal processing steps are those which would be carried out, for example, in the digital computer 12 of FIG. 1. The process steps may be considered as beginning with the summation in block 70 of the value of all of the manipulated variables $Pa_i$ to produce a signal $\Sigma Pa_i$ representative of the total value of the manipulated variables under control. The signal $\Sigma Pa_i$ is then divided into proportionate parts in the block 74 so that the individual output signals of the block 74 are $C_i\rho_i'\Sigma Pa$ and hence are each representative of the proportionate part of the total value of the manipulated variable which is to be accounted for by each of the individual manipulated variables as a result of the control action taken. In the block 74 the values $C_i'\rho_i'$ represent the participation of the $i$th manipulated variable. $C_i'$ represents a conversion factor as may be necessary for the conversion or scaling of the units such as from engineering units into percentages.

The individual outputs of the block 74 each then have added to them a signal such as that on line 76 representative of the difference between an actual zero offset $\overline{ZO_i}$ desired for the value of the manipulated variable and the average zero offset $ZO$, namely a signal $(ZO_i-\overline{ZO})$. This enables each control element to be biased or offset with respect to the others. For example, control element 1 may participate equally with control element 2 but is biased 10 percent higher throughout the control range.

There is then produced on line 78 a signal representing that portion of the total value of the manipulated variable plus any deviation from the average zero offset and then the signal on line 78 is compared with the value of the associated individual manipulated variable $Pa_i$ and that comparison produces a signal on line 80 which represents the difference between the actual value of the manipulated variable and the desired value in order to maintain the predetermined proportionate relationships established in block 74 taking into account any zero offsets. That difference is then compared with a value establishing a deadband which represents a band of values in response to which no participation correction is desired. If the value of the signal on line 80 falls within the deadband the signal $\Delta P\rho_i$ on line 84, which is the output from block 82, will be zero. In addition block 82 includes a comparison of the signal on line 80 with the rate limit $RL_i'$, which rate limit represents the maximum change in the deviation of the manipulated variables from their desired values which will be utilized in correcting the control action each control execution of the corresponding manipulated variables. When the signal on line 84 is the same as the signal on line 80 then the signal on line 80 is beyond the deadband value and not beyond the rate limit whereas the signal on line 84 is zero if the signal on line 80 is within the deadband and the signal on line 84 is equal to the rate limit $RL_i'$ when the signal on line 80 exceeds the rate limit. The signal $\Delta P\rho_i$ on line 84 is a correction signal which is utilized to correct the main or forward control path which will be described subsequently.

The rate limiting accomplished in block 82 is for the purpose of providing an orderly correction of the errors in the participation of the individual control elements in the control of the process variable which is being measured, for it is desired that the correction of the amount by which the individual control elements are out of the desired relationship in their participation in the control should be accomplished without causing errors to develop in the forward or main process control signal path.

In order to compensate for the fact that the total of all of the correction signals may introduce a control offset due to the deadband and rate limit imposed by block 82 it is desirable to sum as in block 90 all of the correction signals so as to obtain a signal $\Sigma \Delta P\rho$ representative of the sum of all of the correction signals. That signal can then be subtracted from the control signal $e_c$ in the forward or main control path as shown in FIG. 2. In this manner the summation of each $\Delta P\rho_i$ and $\Sigma \Delta P\rho$ will always be zero producing no net effect in control.

The main control signal path includes a comparison of the controlled variable $c$ with the set point as indicated by the symbol 92 to obtain a signal on line 93 representative of the error $e$. The signal on line 93 is then processed in accordance with the usual control algorithm by the block indicated as controller 94 to produce as an output a first control signal $e_c$ on line 96. The signal $e_c$ may represent the control signal developed after a processing of the error signal $e$ to provide proportional and integral response and in some cases, where desired, also a derivative response. For purposes of illustration the following description will limit the control response considerations to only proportional and integral response it being well known to those skilled in the art the manner in which the control response may be extended to include the derivative response.

The output of the controller 94 takes into account also an updating of the control signal which is accomplished by virtue of the input on line 98 from the block 100 which compensates the control signal for the excess control action previously called for but not taken, as will be explained.

As previously mentioned the control signal $e_c$ is normally reduced by a value $\Sigma \Delta P\rho$ supplied on line 102 so that the modified signal may be supplied on line 104 to the block 106 where that signal is divided into separate second control signals each representing a predetermined portion $C_i\rho_i$ of the first control signal $e_c$ corrected by the signal $\Sigma \Delta P\rho$. $\rho_i$ represents the percent participation of manipulated variable $i$ and $C_i$ is the conversion factor for scaling, similar to $C_i'$. The proportionate signals produced by block 106 must be so arranged as to sum to a total value corresponding with the signal on line 104 as affected by an overall conversion factor if needed which is a function of the conversion factors, $C_i$.

Each of the proportionate control signals is corrected by the correction signal supplied on line 85 from line 84. The introduction of the signal from line 85 corrects the second control signals for the amount by which the particular manipulated variable was away from its predetermined desired relationship with the other manipulated variables.

The control signal thus corrected is then a third control signal. It is compared with a rate limit value $RL_1$ as indicated in block 108 such that the output of that block $\Delta Pd_i$ is equal to the input value as long as the input value does not exceed the rate limit $RL_1$ Whereas the value $\Delta Pd_i$ would be set equal to the limit $RL_i$ with the appropriate sign when the input to block 108 does exceed the rate limit.

The values for $\Delta P_i$ calculated after each sampling of the controlled variable for the process 10 are summed and multiplied by a constant $K_i$ to provide a signal on the output line 110 representing the desired value for the particular manipulated variable, namely $Pd_i$. The constant $K_i$ may be used to convert outputs into engineering units. The block 111 has not only an input from line 109 but also input representing the actual manipulated variable value $Pa_i$ on line 112 so that the output on line 110 can be made equal to $K_iP_i(max)$ when $Pa_i$ is greater than $P_i(max)$ or in other words when the manipulated variable is greater than its maximum. Similarly the output on line 110 can be equal to $K_iP_i(min)$ when the value $Pa_i$ is less than its minimum value.

The signal on line 110 is supplied as an input to the control element 24, which control element may be of the type shown in FIG. 1a or FIG. 1b.

The introduction of the rate limit in block 108 may result in a limiting of the control action to something less than that desired because of the limitations of the rate at which the final control element, for example, the valve adjusting motor of FIG. 1a and FIG. 1b can adjust valve 52. Such rate limiting will cause a loss of control information unless appropriate compensation is made by updating the controller. This is accomplished by the accumulation of the excess unused control signals in the accumulator 120 which then provides the excess to the block 100 for the purposes and in the manner described in U.S. Pat. No. 3,566,241 issued to Charles W. Ross on Feb. 23, 1971.

It will be evident from the examination of FIG. 2 that the control normally executed will be of the mandatory type. However, it may be desirable in those situations where the value of the control signal $e_c$ is less than a particular predetermined value to have the control executed in a permissive fashion, that is, only when the sign of the control signal $e_c$ is the same as the sign of the signal $\Delta Pd_i$ representing a particular portion of the control signal. In other words, the control signal is in a direction to return the control element to its desired position.

To accomplish the transfer from mandatory to permissive control additional signal processing is required. That additional signal processing is accomplished by comparing the absolute value of the control signal $e_c$ with a predetermined value $e_c'$, as shown. The comparison is represented by the block 122 which also indicated that when the absolute value of the control signal $e_c$ is greater than the value $e_c'$ the signal paths shown by lines 102 and 85 are completed paths as indicated by the closed switches shown in those paths. The switch shown connecting the signal $\Delta Pd_i$ to the rate limiting block 108, which is shown closed, provides the signal path for the mandatory control.

If the sign of the control signal $e_c$ is not the same as the sign of the signal $\Delta Pd_i$, then the switch shown as 124 may be considered opened and that signal path as incomplete. However, when the absolute value of the control signal $e_c$ is less than the predetermined value $e_c'$ and it is desired that permissive control be accomplished, signal paths 102 and 85 are disconnected as is the signal path for the $\Delta Pd_i$ through the switch 126 and instead the signal $\Delta Pd_i$ will be allowed to pass through the switch 124 when the sign of the control signal $e_c$ is the same as the sign of the signal $\Delta Pd_i$ indicating that the desired change in the individual manipulated variable is in the same direction as total desired change for all of the manipulated variables. The sign comparison referred to is made as shown in the block 128.

Figure 3A:
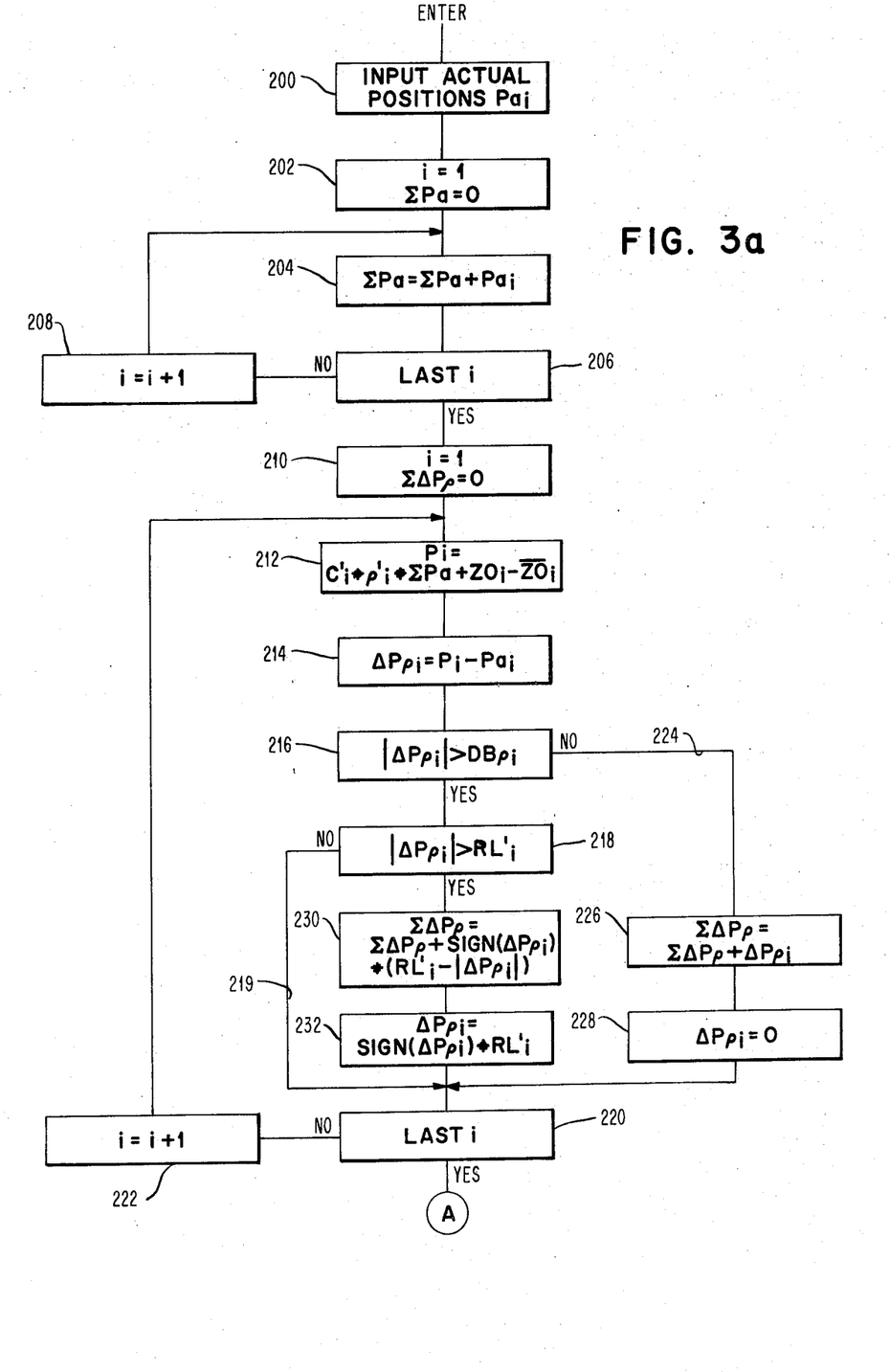
FIG. 3a is part of a flow chart showing an algorithm which may be used as a basis for a program for a digital control system in accordance with the present invention.
Figure 3B:
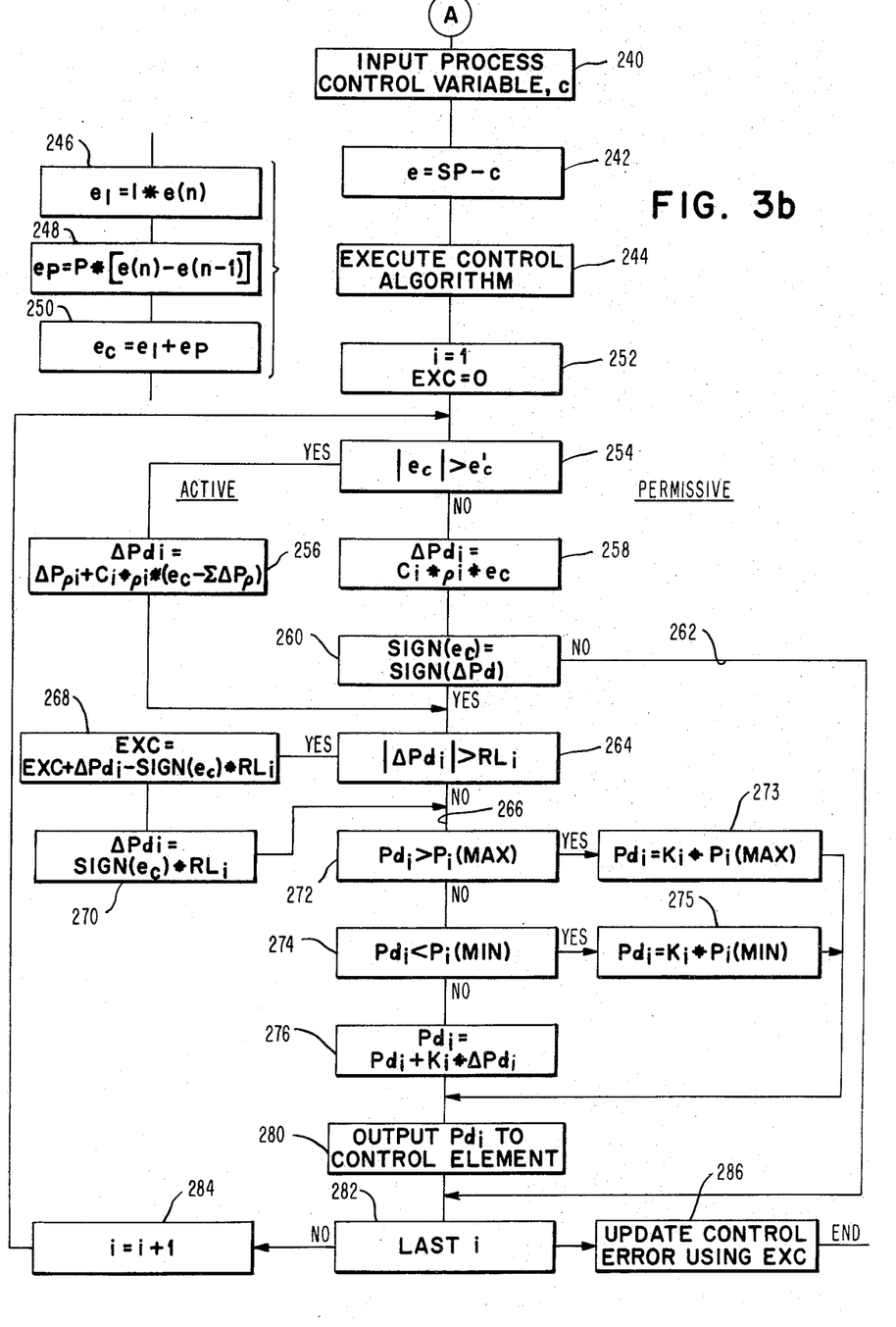
FIG. 3b is a flow diagram showing the remaining part of an algorithm which may be combined with the algorithm of FIG. 3a to provide the complete control system of the present invention.

The signal processing steps shown graphically in FIG. 2 may be accomplished by means of a program for a digital computer following the algorithm illustrated in the flow diagram of FIGS. 3a and 3b. Following this flow chart it will be evident that the program is entered and the various program steps are begun by first sampling the actual positions $Pa_i$ as indicated by block 200. As mentioned before, $Pa_i$ represents the value of the ith manipulated variable. Following the inputting of the actual positions $Pa_i$ the value for $i$ is set equal to 1 and the value for $\Sigma Pa$ is set to zero as indicated by block 202. Then the value $\Sigma Pa_i$ is calculated by summing the values $\Sigma Pa$ as previously determined (initially zero) with the value $Pa_i$. This calculation is shown in block 204 and is followed by a determination, in block 206, as to whether or not the last manipulated variable has been considered, hence the question is asked, "Last $i$". If the answer to that question is "no" then as indicated by block 208 the value of $i$ is increased by one and the calculation made by block 204 is repeated. Thus the calculation of the value $\Sigma Pa$ proceeds by taking into account the value $Pa_i$ for all of the manipulated variables. This summation process is then followed by a setting of the value of $i = 1$ and a setting of the value of $\Sigma \Delta P\rho = 0$ as shown in block 210. Those settings are made whenever all of the manipulated variables have been considered in calculating $\Sigma Pa$.

As a next step the value of $P_i$ which represents the desired value for the $i$th manipulated variable after correction for zero offsets is calculated as shown in block 212 by multiplying the signal $\Sigma Pa$ representing the total value of all of the manipulated variables by a proportionate factor $C_i'\rho_i'$ representing the individual proportional parts of the total which are assigned to each of the manipulated variables in accordance with the desired relationship which is to be maintained by the control. The resulting quantity $C_i'*\rho_i'*\Sigma Pa$ is added to the signal representing the deviation of the zero offset from the average, namely the $ZO_i - \overline{ZO}_i$ where $ZO_i$ represents the zero offset to determine the range in which the participation applies and $\overline{ZO}_i$ represents the average value of all of the values of $ZO_i$.

Following calculation in block 212 is a calculation of the value $\Delta P\rho_i$ by subtracting from the value $P_i$ the value $Pa_i$, as shown in block 214. Thus the block 214 serves to compare the actual value of the manipulated variable $Pa_i$ with the computed desired value representing a predetermined portion of the total value of all of the manipulated variables as modified by the zero offset so that there is then produced a signal $\Delta P\rho_i$ which represents the change necessary in the manipulated variable to bring it into the predetermined relationship established for it with regard to the other manipulated variables being controlled.

The value $\Delta P\rho_i$ is then compared with a value previously established to determine the deadband; or, in other words, a band of values for $\Delta P\rho_i$ which will not be effective to modify the control. Thus in block 216 the absolute value of $\Delta P\rho_i$ is examined to see if it is greater than the value for the deadband $DB\rho_i$ and if in fact the absolute value is greater than the deadband value the program then continues to block 218 where the absolute value of $\Delta P\rho_i$ is then compared with the rate limit value $R_i'$ by examining to see if the value of $\Delta P\rho_i$ is greater than $RL_i'$. If it is not then the program continues by way of the path 219 and the question is asked in block 220 as to whether or not the last manipulated variable has been considered and if that is not the case then the value of $i$ is increased by one as shown in block 222 and the program proceeds back to the block 212 to carry out similar calculations for the next manipulated variable being considered.

If the value $\Delta P\rho_i$ is not greater than the deadband value the program instead of going to block 218 would follow the path 224. In the path 224 the calculation shown by block 226 is accomplished, namely the value for $\Sigma \Delta P\rho$ is calculated as being equal to the sum of the values $\Sigma \Delta P\rho$ previously calculated plus $\Delta P\rho_i$ and then as shown in block 228 the value $\Delta P\rho_i$ is set equal to zero and the program continues to block 220. Thus the effect of the computations in block 226 and the setting of the value of $\Delta P\rho_i$ by block 228 is to modify the value of the signal $\Sigma \Delta P\rho$ so that the control signal $e_c$ may be corrected appropriately taking into account the fact that the value $\Delta P\rho_i$ did not exceed the deadband and hence no correction signal $\Delta P\rho_i$ will be used for that particular manipulated variable being considered.

If the absolute value of $\Delta P\rho_i$ is greater than the rate limit $RL_i'$ then the value $\Sigma \Delta P\rho$ is calculated by summing the previous values $\Sigma \Delta P\rho$ with the value established by subtracting the absolute value of $\Delta P\rho_i$ from the rate limit value $RL_i'$ and giving that value the sign of $\Delta P\rho_i$ before summing it with the value $\Sigma \Delta P\rho$ previously obtained. This calculation is shown in block 230 and is followed by the calculation in block 232 wherein $\Delta P\rho_i$ is set equal to the value of the rate limit, namely $RL_i'$ and is given the sign corresponding to $\Delta P\rho_i$ at which time the program proceeds to the block 220.

After all of the manipulated variables have been considered the program then proceeds to the next section of the flow chart as indicated by the connecting symbol A.

Referring to FIG. 3b, it will be evident that the program continues from the connecting point A by inputting the process control variable $c$ as shown in block 214. Next the value for the error $e$ is calculated as being the set point value SP minus the control variable value $c$ as shown in block 242. This calculation of the control error is followed by an execution of the control algorithm as indicated by block 244. The control algorithm may be a simple algorithm such as that shown beside the block 244 or it may be a more complex algorithm following any one of the number of approaches described and discussed in the paper, "Direct Digital Control Algorithm with Anti-Windup Feature" by Harry A. Fertik and Charles W. Ross as presented at the Twenty-Second Annual ISA Conference in Chicago, Ill., in September of 1967.

As an example of the type of control algorithm which may be used the block 246 is shown as computing the integral component of the control signal, namely $e_I$. That component is computed as being the product of the reset rate and the error calculated in block 242. After a calculation of the integral component the calculation may be made, as in block 248, of the proportional component by multiplying the proportional gain P by the difference between the error calculated this time and the error calculated last time. Upon calculating the proportional component the proportional and integral component can be combined by summing as shown in the block 250 to provide the control signal $e_c$.

Having calculated the control signal $e_c$ the program can move to the block 252 where it is indicated that the quantity $i$ is set equal to 1 and the accumulated excess control EXC is set equal to zero. Having set those values as indicated the program proceeds to block 254 where the absolute value of the control signal $e_c$ is examined to see if it is greater than $e_c'$, which is established as the value below which the control is to be permissive rather than mandatory. If the answer to the question posed in block 254 is "yes", the control is an active control of mandatory nature and the quantity $\Delta Pd_i$ is calculated as the sum of the correction signal $\Delta Pp_i$ plus the portion $C_i\rho_i$ of the error signal $e_c$ as it is modified by subtracting the signal $\Sigma\Delta Pp$. This calculation of $\Delta Pd_i$ is shown in block 256.

If the absolute value of the control error $e_c$ is not greater than $e_c'$ then the quantity $\Delta Pd_i$ is calculated as the sum of the portion $C_i\rho_i$ times the control error $e_c$ as shown in block 258 to provide a quantity which may be used for permissive control if the sign of the control error $e_c$ is the same as the sign of $\Delta Pd$ as determined in block 260. If those signs are not the same then no change in magnitude of the manipulated variable is determined for the particular variable being considered and the program proceeds by way of the path 262 to a later point in the program where the program proceeds to the next manipulated variable to be considered. If the signs are the same the program then proceeds to block 264 where the absolute value of $\Delta Pd_i$ is examined to see if it is greater than the rate limit $RL_i$ or in other words the amount of control desired this time is examined to see if it is greater than the amount of control which can be accomplished by the control element this control cycle and, if it is not greater, the program then proceeds along the path 266, however, if the magnitude is greater the program proceeds to block 268 where the excess control EXC is calculated as being the previously accumulated excess value plus the quantity $\Delta Pd_i$ minus the rate limited value $RL_i$ which is given the sign of the control signal $e_c$. Having computed the excess control which has been accumulated the program proceeds to compute as being equal to the limited value $RL_i$ with the sign being the same as the sign of the control signal $e_c$ as indicated in block 270. The program then proceeds to block 272 where the quantity $Pd_i$ last computed is examined to see if it is greater than the maximum value it can have, namely, $P_i(max)$. If it is not, then that same quantity is examined to see if it is less the minimum $P_i(min)$; and if it is not less than the minimum, then a new value $Pd_i$ is computed as being the last value plus a constant $K_i$ times the computed value $\Delta Pd_i$. The value $\Delta Pd_i$ may either be the value computed in block 256 or, if it is greater than the value set for the rate limit, it would be the value established by box 270, namely the rate limit value $RL_i$, unless the absolute value of $e_c$ is not greater than $e_c'$, in which case $\Delta Pd_i$ is calculated in block 258.

The computation of $Pd_i$ is shown in block 276 and follows the examination for the minimum value shown in block 274. If the value $Pd_i$ exceeds the maximum then the value for $Pd_i$ is calculated, as shown in block 273, as being equal to the constant $K_i$ times the maximum value $P_i(max)$, likewise, if the value $Pd_i$ is less than the minimum, then the value $Pd_i$ is set as being equal to the constant $K_i$ times the minimum value $P_i(min)$, as indicated in block 275.

Having calculated the value for $Pd_i$ that value can then be outputted as indicated in block 280 to the control element associated with the particular manipulated variable being considered. The quantity $Pd_i$ may be outputted to the controller elements as shown in FIGS. 1a and 1b, for example, as a potential whose magnitude is proportional to the value $Pd_i$. The potential being developed by any number of well known outputting schemes.

Following the outputting of the value $Pd_i$ the question is asked by the program as to whether or not the last of the manipulated variables has been considered. That question is indicated in block 282. If the answer is "no" then the number for $i$ is then increased by one as shown in block 284; the program then proceeds back to block 254 for the calculation of the value $Pd_i$ for the next manipulated variable. Once the program has calculated the values for $Pd_i$ associated with all of the manipulated variables as an output of those values is accomplished and the program then goes to the block 286 wherein it carries out an updating of the controller using the accumulated value for the excess control, namely EXC. That updating may be carried out, for example, by computing a correct value for the error to be used in the next computation of the control algorithm as, for example, in block 248 after the next sampling period. Thus, the value $e(n-1)$ may be computed as being the sum of the difference between the control signal $e_c$ and the excess accumulated, namely, EXC plus a value equal to the proportional gain P times the error calculated during the previous sampling period with the whole quantity being divided by the sum of the reset rate and the proportional gain thus the value $e(n-1)$ may be calculated as follows:

$$e(n-1) = \frac{(e_o - EXC) + Pe(n-1)}{I+P}$$

The basis for this equation is established in U.S. Pat. No. 3,566,241 previously referred to.

The functional flow diagrams of FIGS. 3a and 3b may be executed on a real time computer by utilization of the Fortran program of the type set forth below.

```
C FORTRAN IV PROGRAM FOR PARTICIPA-
   TION CONTROLLER
C
C THIS PROGRAM USES SUBROUTINES
   ANALOG INPUT—AI, ANALOG
C OUTPUT—AO, TWO MODE CONTROLLER—
   PI, CONTROLLER
C UPDATE, AND CLOCK INTERRUPT PROCES-
   SOR—CLOCK
   EC=0
   DIMENSION DBR(10), RL(10), RLP(10),
   RHOP(10), C(10),CP(10)
   1PMAX(10),PMIN(10),PA(10),    P(10),
   RHO(10),ZO1010)
C READ PROGRAM PARAMETERS VIA
   TYPEWRITER WITH
```

```
C FREE FORMAT
READ                (1,100)ZOAVG,PROP,I
   ACT,SP,ECP,(CP(I),RHOP(I),ZO(I),
   1DBR(I),RLP(I),C(I),RHO(I),RL(I),R-
     MAX(I),PMIN(I),K(I),
   2I=1,10)
      L=0
C SUBROUTINE CLOCK (N,L)—N IS THE IN-
    TERRUPT CHANNEL AND
C L IS A COUNTER INDEXED EACH TIME IN-
    TERRUPTS ARE RECEIVED
   1 CALL CLOCK (1,L)
   2 IF(L)1,1,2
   2 L=0
C SUBROUTINE AI(I,X)—I IS THE ANALOG
    INPUT CHANNEL AND
C X IS THE ARRAY WHERE INPUTS ARE
    STORED
      CALL AI(I,PA(I),I=1,10)
      SPA=0
      DO 3 I=1,10
    3 SPA=SPA+PA(I)
      SDPR=0
      DO 10 I=1,10
      P(I)=CP(I)*RHOP(I)*SPA+ZO(I)−ZOAVG
      DPR(I)=P(I)−PA(I)
      IF(ABS(DPR(I)−DBR(I)) 5,6,6
    5 SDPR=SDPR+DPR(I)
      DPR(I)=0
      GO TO 10
    6 IF(ABS(DPR(I))−RLP(I))10,10,9
    9      SDPR=SDPR+SIGN(DPR(I))*(RLP(I)
      −ABS(SPR(I)))
   10 DPR(I)=SIGN(DPR(I))*RLP(I)
C INPUT CONTROLLED VARIABLE ON CHAN-
   NEL 0
      CALL AI(0, C)
      E=SP−C
C SUBROUTINE PI(P,I,E,EC)—P IS PROPOR-
    TIONAL GAIN,
C I IS RESET ACTION, IS ERROR INPUT
C EC IS UPDATED CONTROL ACTION FROM
    ANTI-WINDUP ROUTINE
      CALL PI(PROP,IACT,E,EC)
      DO 30 I=1,10
      IF(ABS(EC)−ECP) 13,13,14
   13 DPD(I)=C(I)*RHO(I)*EC
      IF(EC*ECP) 30,30,14
   14 DPD(I)=DPD(I)+C(I)*RHO(I)*(EC−SDPR)
   15 IF(ABS(PD(I))−RL(I)) 17,17,16
   16 EXC=EXC+DPD(I)−ASIGN(EC)*RL(I)
      DPD(I)=SIGN(EC)*RL(I)
   17 IF(PD(I)−PMAX(I)) 19,19,18
   18 PD(I)=PMAX(I)
   19 IF(PD(I)−PMIN(I)) 20,21,21
   20 PD(I)=PMIN(I)
   21 PD(I)=PD(I)+K(I)*DPD(I)
C SUBROUTINE AO(I,X)—I IS THE CHANNEL
    NUMBER AND
C X IS VARIABLE FOR OUTPUT
      CALL AO(I,PD(I))
      CALL AO(I+10,EE(I))
   30 CONTINUE
C SUBROUTINE UPDATE(X,Y)—X IS THE EX-
    CESS CONTROL
C ACTION RESULTING WHICH IS PROCESS
    AND STORED IN
C Y FOR USE BY CONTROLLER NEXT INTER-
    VAL
      CALL UPDATE(EXC,EC)
C RETURN TO CLOCK ROUTINE TO AWAIT
    NEXT CONTROL
C INTERVAL
      GO TO 1
  100 FORMAT( )
      END
```

What is claimed is:

1. The method for controlling a plurality of related manipulated variables in a process so as to maintain a measured process variable at its set point while maintaining a predetermined relationship between the manipulated variables comprising the steps of producing in response to an error signal calculated as the deviation of the measured process variable from its set point a first control signal representing the total change desired in all of said manipulated variables to bring said measured process variable back to its set point, producing a separate second control signal for each manipulated variable in response to said first control signal so that each of said second control signals represents a predetermined part of said first control signal and the sum of said second control signals represents the total value of said first control signal, producing third control signals by adding to each of said second control signals a correction signal representing the deviation of the value of the manipulated variable from a value representing a predetermined part of the total value of all of said manipulated variables, modifying each manipulated variable in accordance with the value of each of said third control signals, measuring the value of each manipulated variable, summing all of said last named measurements to obtain a total value for said manipulated variables, producing from said last named total value a partial signal for each manipulated variable of value representing a predetermined part of said total value for the manipulated variable such that the sum of all of said parts equals said total, and comparing each of said partial signals to the measured value of the corresponding manipulated variable to produce in accordance with the difference therebetween said correction signals.

2. The method set forth in claim 1 in which the predetermined parts of said first control signal used to produce said second control signals each represent the same fraction of the first control signal as the fractions of the total value of the manipulated variables represented by partial signals.

3. The method set forth in claim 1 in which the absolute value of the first control signal is compared with a predetermined minimum value and the sign of said first control signal is compared with the sign of the third control signal and in which a second control signal is produced only for those manipulated variables for which said signs are the same when the absolute value of the first control signal does not exceed said predetermined minimum value.

4. The method set forth in claim 1 in which said third control signals are each compared with a predetermined limit value and the modification of each manipulated variable is limited in accordance with said limit value.

5. The method set forth in claim 1 in which said partial signals are modified by a value representing the zero offset for the individual manipulated variables.

6. The method as set forth in claim 1 in which
said correction signals are compared with predetermined values establishing maximum values for said correction signals,
said correction signals are set to the maximum values if those maximum values are exceeded,
said correction signals are summed to produce an error correcting signal, and
said error correcting signal is subtracted from said first control signal.

7. The method as set forth in claim 1 in which
said correction signals are compared with predetermined values establishing a deadband,
said correction signals are set to zero if their value does not exceed the deadband values,
said correction signals are summed to produce an error correcting signal, and
said error correcting signal is subtracted from said first control signal.

8. The method as set forth in claim 1 in which
said correction signals are compared with predetermined values establishing a deadband and maximum values for said correction signals,
said correction signals are set to zero if their value does not exceed the deadband values and are set to the maximum values if those maximum values are exceeded,
said correction signals are summed to produce an error correcting signal, and
said error correcting signal is subtracted from said first control signal.

* * * * *

PO-1050
(5/69)

UNITED STATES PATENT OFFICE
CERTIFICATE OF CORRECTION

Patent No. 3,691,354      Dated September 12, 1972

Inventor(s) Thomas A. Green and Charles W. Ross

It is certified that error appears in the above-identified patent and that said Letters Patent are hereby corrected as shown below:

Col. 4, line 20,    "$\overline{ZO}_i$" should read --$ZO_i$--.

Col. 4, line 21,    "ZO" should read --$\overline{ZO}$--.

Col. 5, line 64,    "$RL_1$ Whereas" should read --$RL_i$ whereas--.

Col. 6, line 1,    "$\Delta P_i$" should read --$\Delta Pd_i$--.

Col. 6, line 8,    after "also" insert --an--.

Col. 6, lines 49 and 50,    "indicated" should read --indicates--.

Col. 8, line 3,    "$R_i$'" should read --$RL_i$'--.

Col. 8, line 48,    "214" should read --240--.

Col. 10, line 65,    "ZO1010)" should read --ZO(10),DPR(10)--.

Col. 11, line 41,    after "ACTION," insert --E--.

Signed and sealed this 20th day of February 1973.

(SEAL)
Attest:

EDWARD M. FLETCHER, JR.            ROBERT GOTTSCHALK
Attesting Officer                   Commissioner of Patents